United States Patent [19]
Kopp et al.

[11] Patent Number: 4,876,012
[45] Date of Patent: Oct. 24, 1989

[54] HOLLOW FIBRE FILTER CARTRIDGE AND HEADER

[75] Inventors: Clinton V. Kopp, Castle Hill; Dennis Roberts, Berowra Heights; Bruce G. Biltoft, Annandale; Victor White, Lane Cove, all of Australia

[73] Assignee: Memtec Limited, Parramatta, Australia

[21] Appl. No.: 236,671

[22] PCT Filed: Sep. 10, 1987

[86] PCT No.: PCT/AU87/00309
§ 371 Date: May 6, 1988
§ 102(e) Date: May 6, 1988

[87] PCT Pub. No.: WO88/01895
PCT Pub. Date: Mar. 24, 1988

[30] Foreign Application Priority Data

Sep. 12, 1986 [AU] Australia .................. PH7971

[51] Int. Cl.⁴ .................................... B01D 13/00
[52] U.S. Cl. ............................ 210/644; 210/650; 210/321.81; 210/321.9
[58] Field of Search ............... 210/321.69, 321.78, 210/321.79, 321.8, 321.81, 321.87, 321.88, 321.89, 321.9, 634, 644, 645, 646, 649, 650, 321.6

[56] References Cited

U.S. PATENT DOCUMENTS 4,265,763 5/1981 Bollinger et al. .............. 210/321.89

FOREIGN PATENT DOCUMENTS 217780 1/1957 Australia .
2011274 7/1979 United Kingdom .

*Primary Examiner*—Frank Sever
*Attorney, Agent, or Firm*—Oblon, Spivak, McClelland, Maier & Neustadt

[57] ABSTRACT

A fluid filter has a bundle of porous hollow fibres (40) within a casing. At one end of the casing (40) there is a header (41) which has a feed passageway (55) therethrough and in communication with the interior of the casing (40) and the exterior of the fibres. The header (41) also has a filtrate passageway (64) therethrough and in communication with the open ends of the fibres. At the other end of the casing there is a second header (42) which has a treated feed passageway (72) therethrough and in communication with the interior of the casing (40) and the exterior of the fibres. The header (42) also has a filtrate passageway (74) therethrough and in communication with the open ends of the fibres. The feed, treated feed and filtrate passageways (55, 72, 64 & 74) area formed in the off set portions (56, 73, 65 & 75) of the headers (41, 42) that have planar parallel end faces whereby a plurality of filter units may be joined together without a manifold to form a bank of filters.

31 Claims, 15 Drawing Sheets

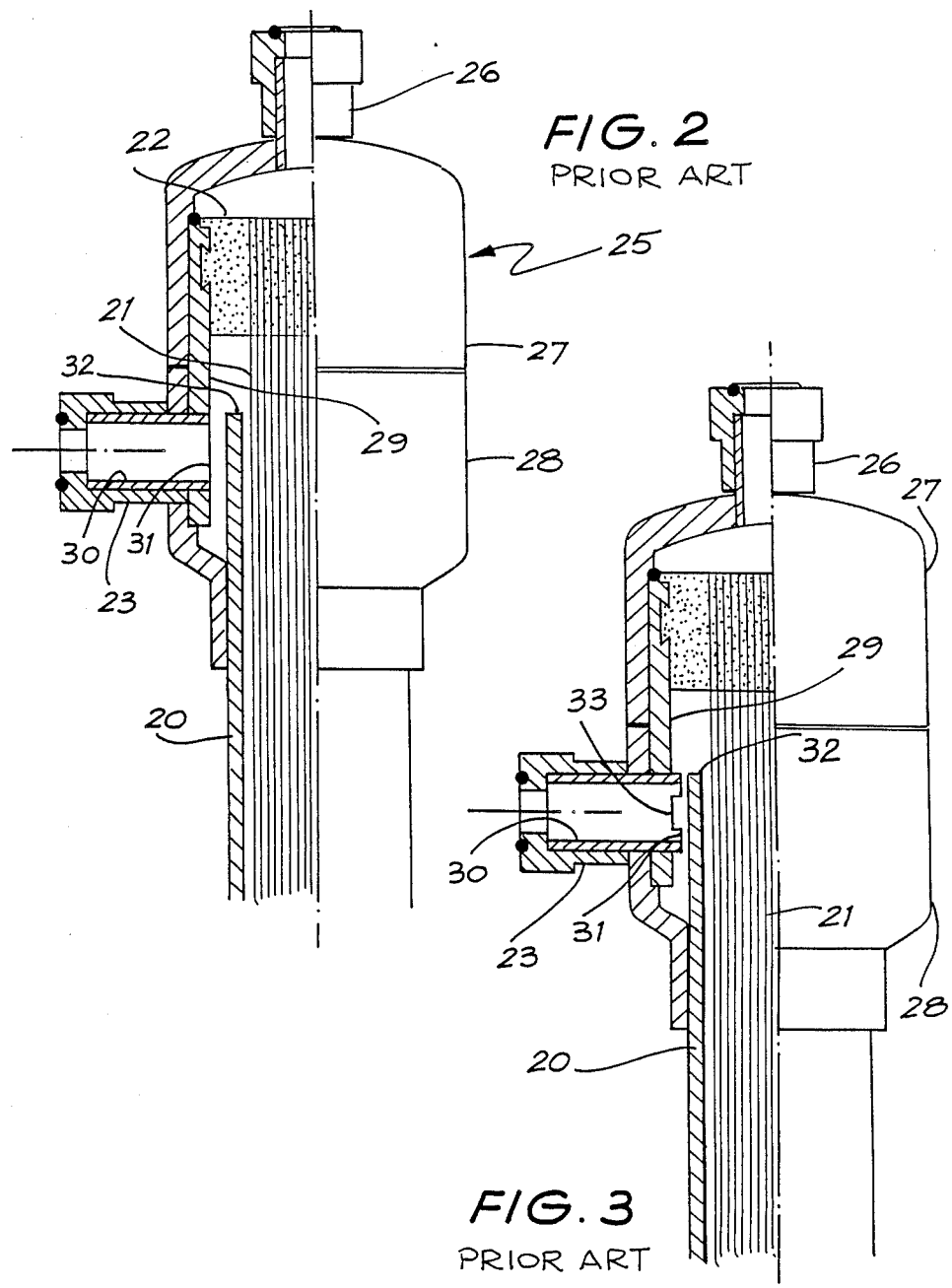

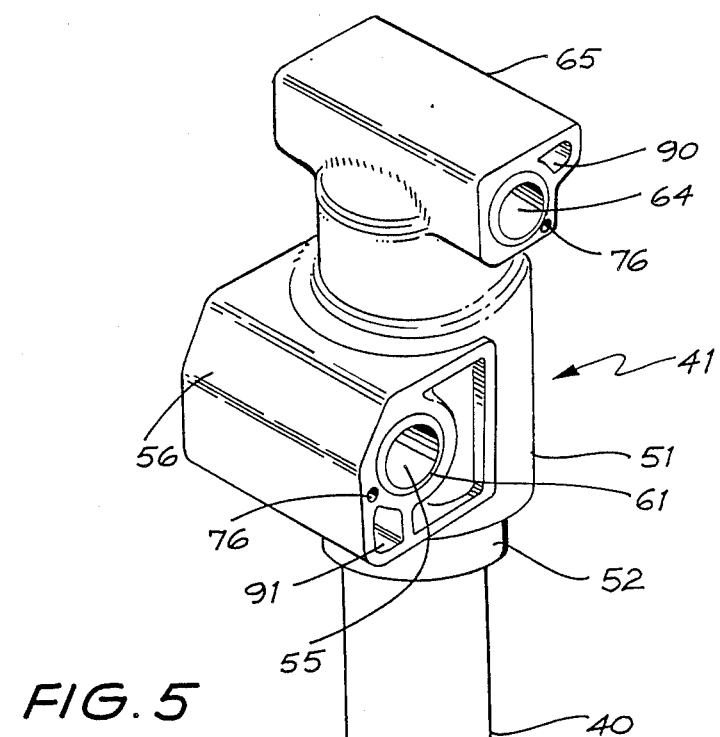
FIG. 5
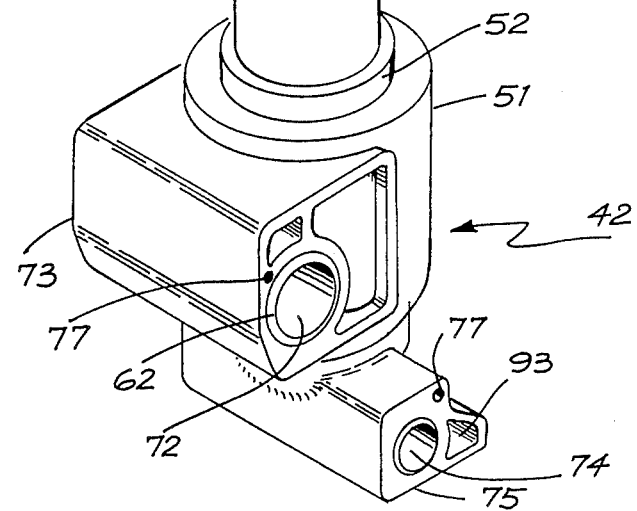

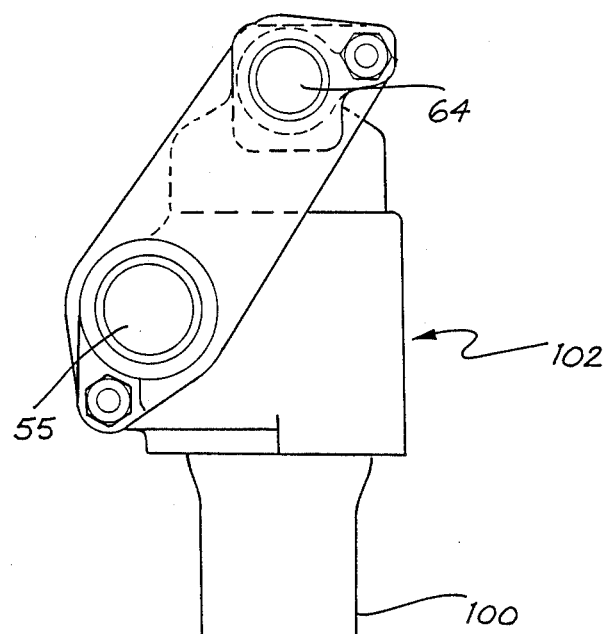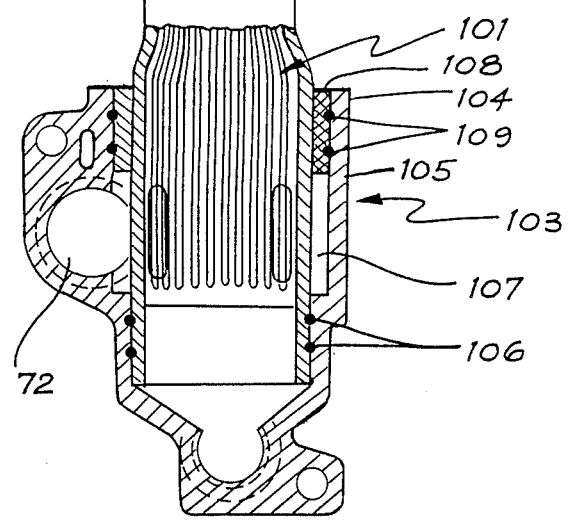
FIG. 13

HOLLOW FIBRE FILTER CARTRIDGE AND HEADER

BACKGROUND OF THE INVENTION

1. Field of Invention

This invention relates to hollow fibre filters and more particularly to shells or casings which house the fibres and to the headers through which fluids pass to and from the shell.

2. Discussion of the Background

In this specification, the term "hollow fibre" refers to fibres of a tubular shape having a continuous passageway (or lumen) disposed substantially along the axial centre line of the fibre. The term "membrane" refers to porous or microporous material which may, inter alia, be in the shape of a hollow fibre.

Hollow fibre filters consist of a bundle of hollow, porous, polymeric fibres which can be arranged in the shell or casing in either a tube-in-shell or candle-in-shell configuration.

Tube-in-shell filters which are widely used for ultrafiltration and microfiltration consist of a number of hollow porous fibres aligned side by side as a bundle and which are secured at each end by being cast in a resin, care being taken to keep the lumens of the fibres open. The bundle thus formed is either permanently bonded at each end to an outer shell, which may be made of plastic material, or it is fitted or moulded with sealing means for insertion into a reuseable, usually metal, shell.

Candle-in-shell filters are similar except that the fibre bundle is attached to the cartridge shell at one end, and at the other the ends of the fibres are each sealed but left free of one another. Alternatively, the fibres in the bundle are each looped so that both ends of each fibre are sealed in the resin casting.

The assembly of the fibre bundle and shell forms what is called a filter cartridge. At each end of the cartridge there is a header through which fluids pass to and from the cartridge. The feed to be filtered may be applied to either he inside or the outside of the fibres with the filtrate being withdrawn from the other side of the fibres.

Cartridges and headers are often bonded or welded to one another to form an integral structure. Sometimes the whole fibre plus shell plus header assembly is called a cartridge, but in this specification the term "cartridge" applies to the assembly of fibre bundle and shell without the headers and the term "filter" applies to the cartridge plus headers.

A plurality such filters may be connected in parallel or in series and are usually coupled by threaded screw fittings to piping from a feed pump and to piping leading to a filtrate collection apparatus. The term "bank", "bank of filters", or "filter bank" is applied to such an assembly of filters. The piping assemblies which deliver feedstock to and collect filtrate and concentrate from a plurality of filters, are each called a manifold.

Existing designs have many disadvantages. For example, screw fittings are expensive and take up space. Furthermore, in many applications (such as shipboard or portable use) the maximum possible area of filter membrane must be contained in the smallest possible volume. Filters with protruding fittings do not use space economically. In addition, portable applications require light weight construction using a minimum of materials.

Another disadvantage of existing designs is that equipment incorporating lightweight cartridges and headers made of polymeric plastic materials is not transportable in an assembled or partially assembled form. Because piping and screw fittings support a cantilevered assembly, they can snap if transported on a truck in rough terrain or if delivered by helicopter or parachute.

There is a need for compact transportable equipment for mobile or military use. There is also a need that such equipment be at least partially assembled during transport and that it be easy to complete the assembly for rapid use in the field.

A disadvantage of metal shells and headers is that they are expensive, and, for economy, require that the bundle of hollow fibre membranes be replaceable within the metal shell. This is achieved with a series of O-rings at each end of the bundle which must then be inserted with considerable mechanical force into the metal tube and the metal tube reassembled into or onto the header. Fibre bundle inspection and replacement is, as a consequence, difficult.

Furthermore, it is desirable to have a range of filter dimensions made available for different applications Varying feedstocks to be filtered contain different amounts of impurities and for economy, those with few impurities should be filtered at high flux rates. Long cartridges containing fine fibres are not able to provide a high velocity of drawoff of filtrate because of the hydraulic pressure drop of high volumetric flow rates in the narrow lumens of the fibres and hence short cartridges are required. Conversely, dirty feeds require longer cartridges where the lower flux rates present no problems of lumen pressure drop. With metal shells and headers, variable cartridge and filter dimensions are expensive to implement and service.

Another problem with prior art designs arises because different types and batches of fibres have different quality in terms of initial defects or service failure rates per unit of fibre surface area. If cartridges can be manufactured cheaply enough then economy, convenience and utility can be optimised by varying the number of fibres per cartridge.

Thus, higher defect-rate fibres could be manufactured into a cartridge with fewer fibres so that the chance, and hence the penalties, of a failed cartridge would be less. Because of the limitations imposed by practically obtainable minimum defect rates, optimal cartridge diameters for industrial porous hollow fibre microfilters are usually 70 to 80 mm containing 1 to 2 square meters of membrane. These figures will, of course, increase as fibres become more reliable and cheaper, and be constrained only by practical limitations of feedstock penetration to all parts of the hollow fibre membrane bundle during operation.

As soon as one fibre breaks or develops a fault, integral plastic cartridges and headers must be replaced. Moreover, repair of damaged fibres is not economic.

Cartridges are tested for failure by means of a bubble pressure test. When water occupies all of the pores in the membrane, a certain pressure, known as the bubble point of the membrane, has to be exceeded to overcome the interfacial tension of the water in the pores. In the bubble pressure test, air is forced back into the lumens of the wetted fibre. Failed fibres allow air to pass through the fibre walls at a pressure lower than the bubble point of the membrane. The opacity of prior art industrial cartridges and headers does not allow visual detection of a failed cartridge, and each cartridge must be individually tested after first being disassembled from the filter bank. Individual small medical cartridges have usually been made transparent, at greater cost, to allow bubble testing.

Hitherto, feed has usually been pumped into the shell as a radial jet at right angles to the direction of flow within the shell. With radial introduction of feed, the fibres at the inlet end on the opposite side from the inlet receive little feed. This is because the feed stream impacts against the fibres and is diverted down them, rather than swirling round them. Similarly, in the absence of evenly distributed withdrawal of feed, dirt accumulates at the outlet end against the side of the fibre bundle remote from the outlet. A considerable amount of useful filter surface is by-passed, which is inefficient.

U.S. Patent Specification Nos. 4,565,630, 4,578,190, 4,639,353, 4,617,161, 4,568,456, 4,632,756, 4,414,113, 4,390,575, European Patent Specification Nos. 186,293, 163,900, Japanese Patent Specification Nos. 61-031,164, 60-261,507, 60-261,506, 60-061,006, 59-115,702, 58-041,830, 58-143,805, 57-159,502, 57-150,402 and United Kingdom Patent Specification No. 2,090,546 all disclose slight variations on the general principle of filter design in which a plurality of mostly hollow fibre membranes are disposed inside a shell with the ends of the fibre lumens sealed from the outside of the membranes. The shell has a feed inlet as well as a filtrate outlet and usually has a feed outlet or return, all of which are in the form of a spigot or port. None of these previous designs provides an efficient means of connecting a plurality of filters.

U.S. Pat. Nos. 4,346,006, 4,400,276, 4,497,104, 4,308,654, Japanese Patent Nos. 65-024,004, 61-157,308, 61-057,206, 59-115,702, 59-130,503, 51-093,788, 51-103,083, 56-141,801, 56-037,002, 55-157,304, 58-109,104, European Patent No. 183,256 and Russian Patent No. 1,158,211 all disclose slight variations on methods of manufacturing hollow fibre membrane cartridges and filters which have the general form of parallel or substantially parallel hollow fibre membranes sealingly enclosed in a shell to form a cartridge, with a header or shell entry and exit ports for feedstock, filtrate and concentrate, however, none of these inventions makes use of the headers as an efficient means of connecting more than one filter in a bank.

A review of header and cartridge or filter designs is given in French Patent No. 2,267,138 which discloses a hollow fibre membrane filter in which the bundle of fibres is enclosed by an elastic, tightly wrapped sheath. There is a common factor in the design of most prior art hollow fibre membrane filters, being that of disposing a bundle of mostly parallel hollow fibre membranes inside a usually cylindrical shell Sometimes the shell has inlet ports for feedstock or filtrate, however, a header will always provide a sealing means so that the ends of the lumens are separate from the outside of the fibres. The prior art does not, however, disclose an efficient means of connecting a plurality of cartridges.

DISCLOSURE OF THE INVENTION

It is an object of this invention to provide a header for a hollow fibre filter which provides an efficient means of connecting more than one filter in a bank.

According to one aspect of the invention there is provided a filter comprising:

(i) an elongated open-ended casing having transfer ports adjacent each end thereof to provide fluid communication between the outside and inside of the casing,
(ii) a bundle of hollow, porous, polymeric fibres within the casing,
(iii) a first plug at one end of the casing in which one end of the bundle of fibres is embedded whereby the plug prevents flow of fluid out said one end of the casing other than through the lumens of the fibres,
(iv) a second plug closing the other end of the casing,
(v) a first transfer header at said one end of the casing and including:
  (a) a body portion that encloses said one end of the casing,
  (b) a feed passageway extending through said first header having an inlet at one end for receiving feed to be treated, an outlet at the other end adapted to be connected to the inlet of the feed passageway of an adjacent first header and a discharge port for delivering feed to the casing,
  (c) an inlet chamber in fluid communication with the discharge port of the feed passageway and the transfer port at said one end of the casing,
  (d) an outlet chamber for receiving filtrate from the open ends of the fibre lumens, and,
  (e) a filtrate passageway extending through said first header having a receiving port for receiving filtrate from the outlet chamber, an outlet at one end for discharging filtrate and a inlet at the other end adapted to be connected to the outlet of the filtrate passageway of an adjacent first header,
(vi) a second transfer header at the other end of the casing and including:
  (a) a body portion that encloses said other end of the casing,
  (b) an outlet chamber for receiving treated feed from the transfer port at said other end of the casing, and,
  (c) a treated feed passageway extending through said second header having a receiving port for receiving treated feed from the outlet chamber, an outlet at one end for discharging treated feed and an inlet at the other end adapted to be connected to the outlet of the feed passageway of an adjacent second header.

In a modification of the invention, the second plug closing the other end of the casing has embedded therein the other end of the bundle of fibres whereby the second plug prevents flow of fluid out said other end of the casing other than through the lumens of the fibres and the second header has an outlet chamber for receiving filtrate from the fibre lumens and a filtrate passageway extending therethrough which has a receiving port for receiving filtrate from the outlet chamber, an outlet at one end for discharging filtrate and a inlet at the other end adapted to be connected to the outlet of the filtrate passageway of an adjacent first header.

Preferably, a bank of such filters is connected together by their headers so that the feed passageways and filtrate passageways are connected in series whereby each filter may be supplied from the one source of feed with a portion of the feed being introduced into the inlet chamber of each filter, the filtrate from each filter is directed to the interconnected filtrate passageways and the treated feed from each filter is directed to the interconnected treated feed passageways.

BRIEF DESCRIPTION OF THE DRAWINGS

In order that the invention may be more readily understood and put into practical effect, reference will now be made to the accompanying drawings in which:

FIG. 2 is a partly broken-away view of one end of the prior art filter device shown in FIG. 1, FIG. 3 is a view similar to FIG. 2 of a modified form of the filter, FIG. 5 is a perspective view of a single filter unit according to one embodiment of the invention, FIG. 13 is a partially broken-away side elevational view of a candle-in-shell cartridge and header according to another embodiment of the invention.

DESCRIPTION OF THE PREFERRED EMBODIMENTS

Figure 1:
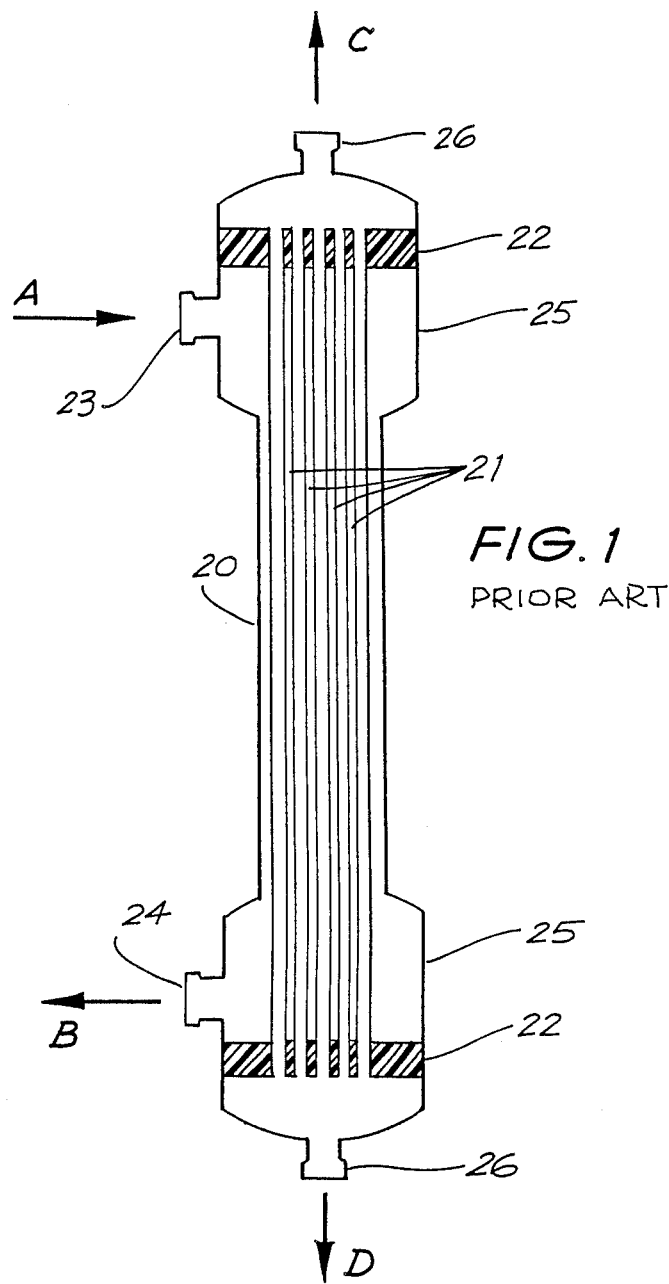
FIG. 1 is a diagrammatic view of a tube in plastic shell hollow fibre filter device typical of the industrial prior art.

The prior art tube-in-shell hollow fibre filter shown in FIG. 1 includes a plastic casing 20 that houses a bundle of hollow, porous, polymeric fibres 21. The respective ends of the hollow fibres 21 are embedded in a resin plugs 22 in each header 25. Feed is introduced through inlet 23 in the direction of arrow A and treated feed is discharged through outlet 24 in the direction of arrow B. Filtrate is drawn off through outlets 26 in the directions of arrows C and D.

One end of the filter of FIG. 1 is shown on an enlarged scale in FIG. 2. The header 25 is made of two parts 27, 28 within which is located a collar 29 that supports a spigot leading from the inlet 23. In this embodiment of the prior art filter, the inner end 31 of the spigot 30 is flush with the inner surface of the collar 29 and the casing 20 projects into the header part 28 with its end 32 terminating beyond the spigot 30.

The modified version of the end of the prior art filter shown in FIG. 3 is substantially similar to that shown in FIG. 2 except that the spigot 30 projects beyond the inner surface of the collar 29 and that the inner end 31 of the spigot 30 has a cut-away portion 33.

Figure 4:
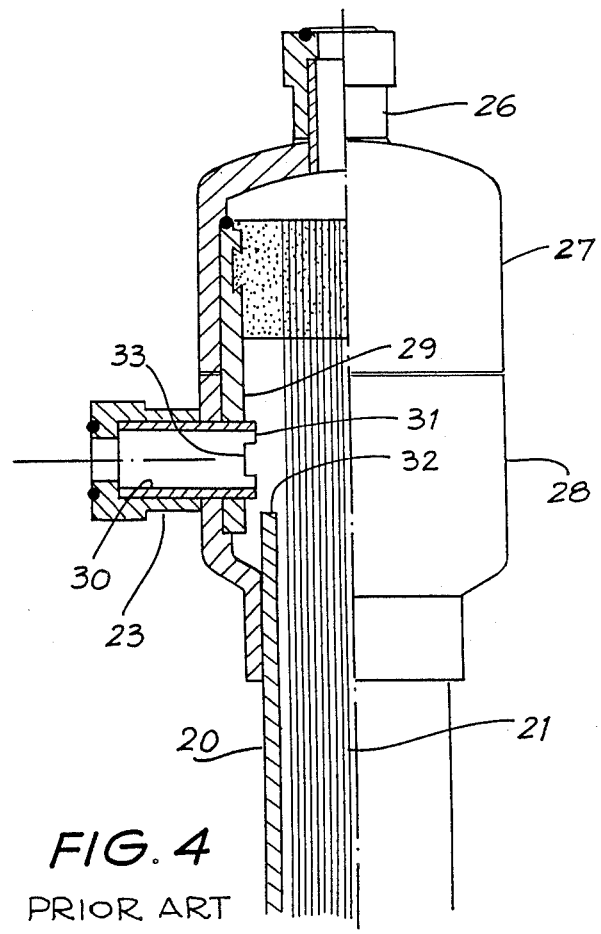
FIG. 4 is a view similar to FIG. 2 of a further modified form of the filter.

The modified version of the end of the prior art filter shown in FIG. 4 is substantially similar to that shown in FIG. 3 except that the inner end 32 of the casing 20 projects into the header part 28 but terminates short of the spigot 30.

The specific designs of the prior art filters shown in FIGS. 2 to 4 will be referred to below in relation to Example 3 which demonstrate the effectiveness of filters according to the invention.

Figure 6:
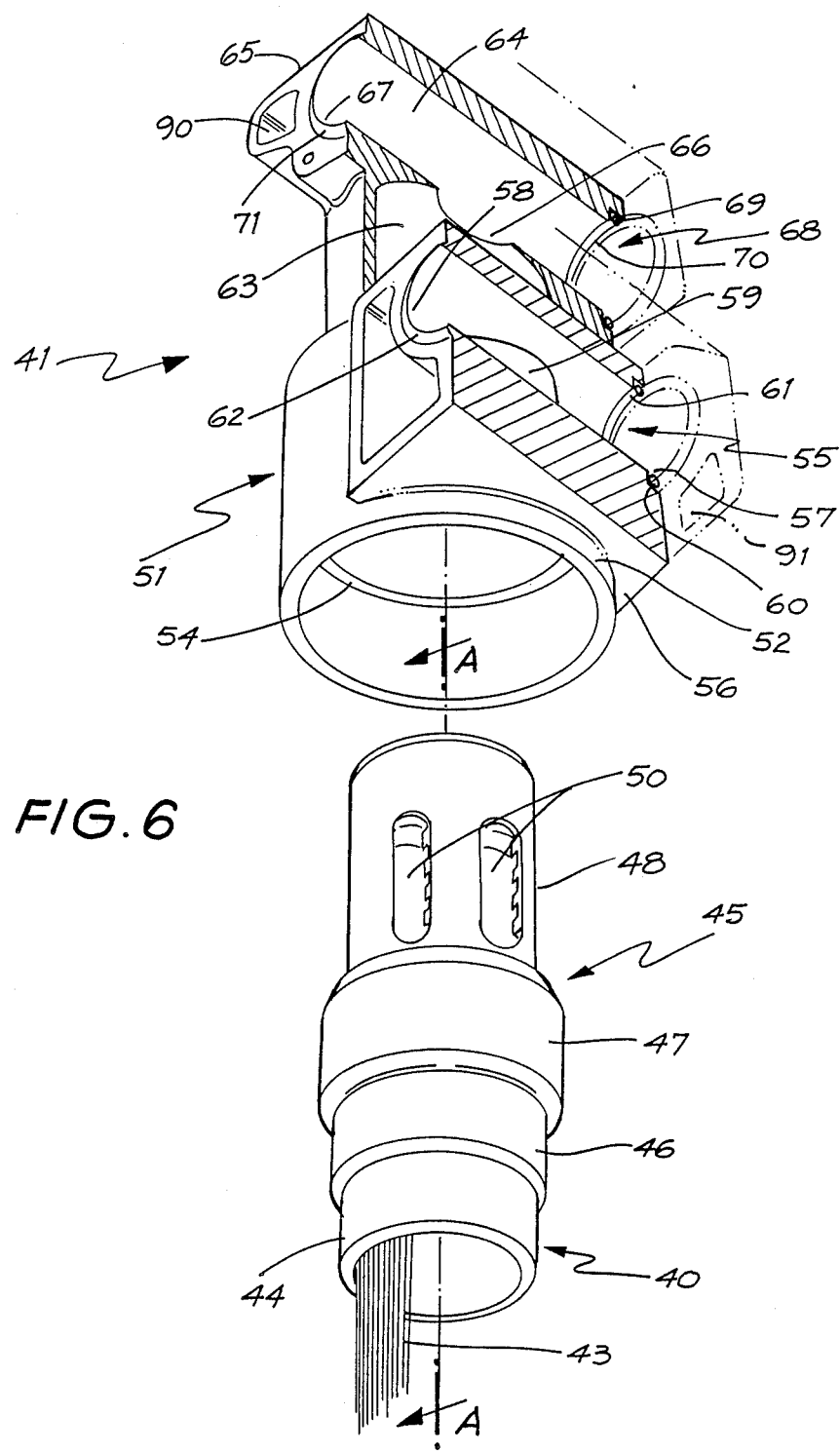
FIG. 6 is an exploded, partly cut away view of one end of the filter unit shown in FIG. 5.
Figure 7:
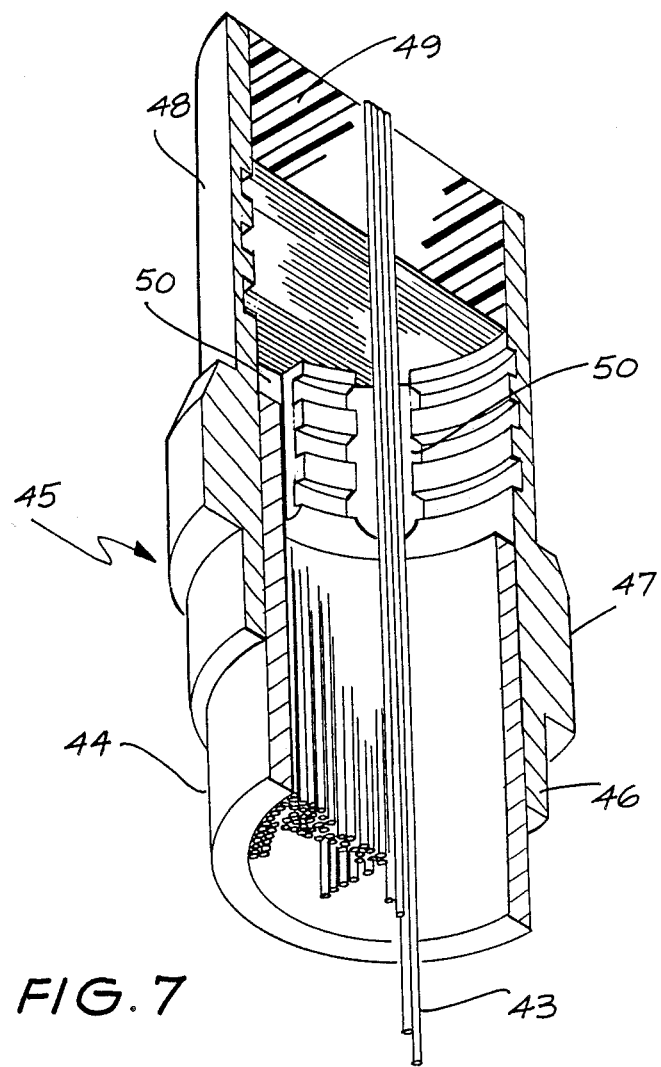
FIG. 7 is a view taken along lines A—A of FIG. 6.

One embodiment of a filter unit according to the invention is shown in FIGS. 5 to 7. The filter unit includes a casing 40, a first transfer header 41 at the top of the casing 40 and a second transfer header 42 at the bottom of the casing 40. The casing 40 contains a bundle of hollow, porous, polymeric fibres 43 (see FIGS. 6 and 7). In this instance, each fibre, which is made of polypropylene, has an average pore size of 0.2 micron, a wall thickness of 200 micron and a lumen diameter of 200 micron. There are 3,000 hollow fibres in the bundle 43 but this number, as well as the individual fibre dimensions, may be varied according to operational requirements.

The top of the casing 40 is shown in FIGS. 6 and 7 and, in this instance, the bottom of the casing 40 is the same although this need not be so as will be evident from the embodiment of the invention described below in relation to FIG. 13.

As can be seen in FIGS. 6 and 7, the casing 40 consists of a main tube 44 and an end portion 45 which includes a skirt 46, a collar 47 and an end piece 48. The main tube 44 which is bonded both to the skirt 46 and the collar 47 terminates beneath the collar 47.

The end piece 48 has a plug 49 (see FIG. 7) of polyurethane resin in which is embedded the upper ends of the fibres 43 whereby the plug 49 prevents flow of fluid out of the end of the casing 40 other than through the lumens of the fibres 43. Transfer ports 50 are formed in the end piece 48 beneath the plug 49.

As can be seen in FIG. 6, the main body 51 of the header 41 has a skirt 52 which depends downwardly from the body 51 and receives the collar 47. In this instance the collar 47 is bonded to the skirt 52, however, it may be releasably secured thereto by means of "O" rings.

The internal diameter of the main body 51 is larger than the external diameter of the end piece 48 of the casing 40 to provide an annular inlet chamber 53 (see FIG. 9) that is closed at the top by an inner shoulder 54 of the header 41 and at the bottom by the collar 47 of the casing 40.

The header 41 has a feed passageway 55 extending through an off-set portion 56 of the body 51. The feed passageway 55 has an inlet 57 at one end for receiving feed to be treated, an outlet 58 at the other end adapted to be connected to the inlet of the feed passageway of an adjacent top header and a discharge port 59 for delivering feed to the inlet chamber 53. Around the periphery of the inlet 57 there is a recess 60 which receives an "O" ring 61 and around the periphery of the outlet 58 there is a bevelled annular projection 62. As can be seen in FIGS. 5 and 6, the end faces of the off-set portion 56 are planar and parallel Transfer apertures 50 in the end piece 48 of casing 40 permit flow of feed from the inlet chamber 53 to the interior of the casing 40 where it is applied to the external surfaces of the fibres 43. Filtrate drawn off from the lumens of the fibres 43 is collected in the outlet chamber 63.

A filtrate passageway 64 that extends through the top portion 65 of the header 41 has a receiving port 66 for receiving filtrate from the outlet chamber 63, an outlet 67 at one end for discharging filtrate and an inlet 68 at the other end adapted to be connected to the outlet of the filtrate passageway of an adjacent top header. Around the periphery of the inlet 68 there is a recess 69 which receives an "O" ring 68 and around the periphery of the outlet 67 there is a bevelled annular projection 71. As can be seen in FIGS. 5 and 6, the end faces of the top portion are planar and parallel.

In this embodiment of the invention, a similar header 42 provided at the bottom of the casing 40 has a treated feed passageway 72 in an off-set portion 73 of the body 51 and a filtrate passageway 74 that extends through bottom portion 75 of the header 42. In all other respects, the bottom header 42 is the same as the top header 41.

Figure 8:
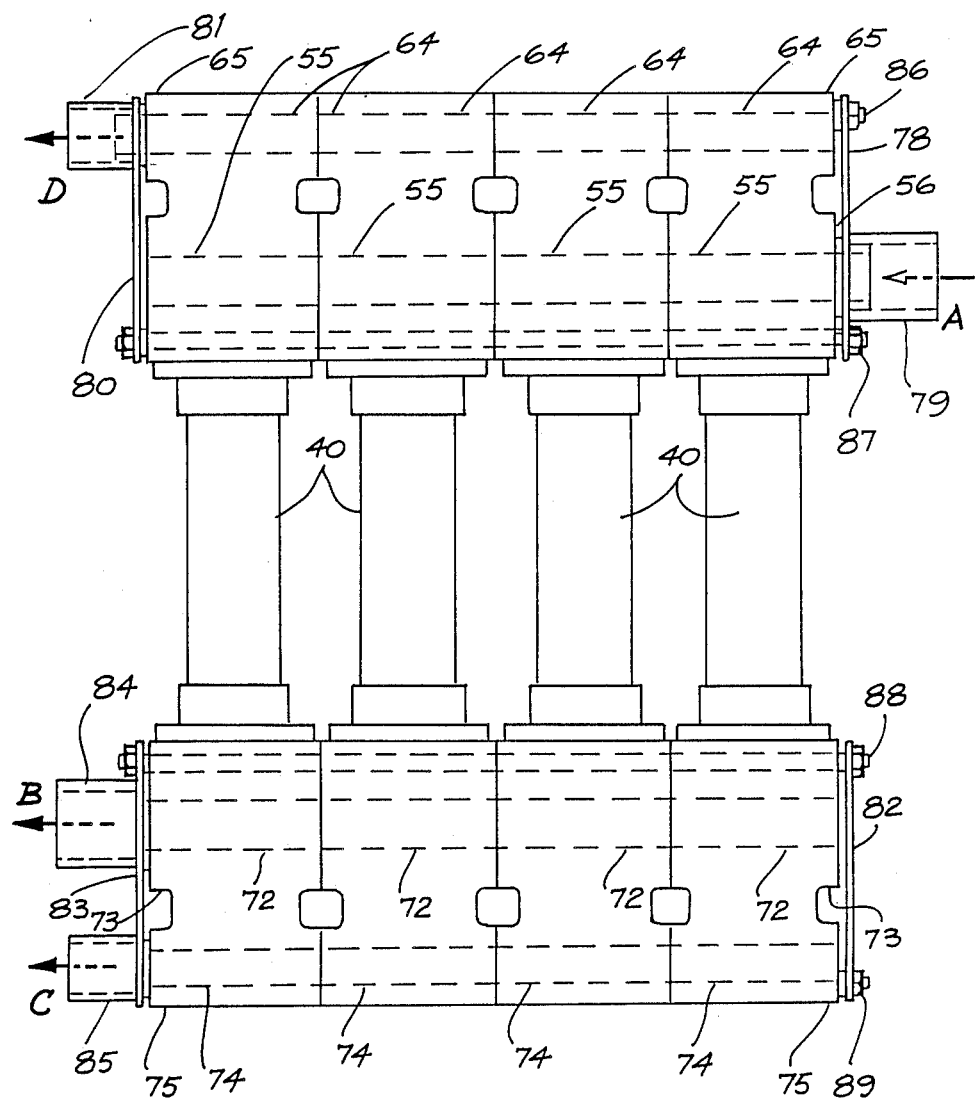
FIG. 8 is a front elevational view of an assembly of the filter units shown in FIGS. 2 and 3.

Filter units as described in relation to FIGS. 5 to 7 may be assembled together to form a bank of filter units as shown in FIG. 8 without the need for pipe work or additional manifolds between each filter unit. To achieve this, the planar end faces of the off-set portions 56 and 73 and of the top and bottom portions 65 and 75 of the headers 41 and 42 are butted against the end faces of adjacent filter units. Correct alignment of the feed passageways 55, the treated feed passageways 72 and the filtrate passageway 64 and 74 is assured by means of pins 76 in the end faces which engage in recesses 77 in the adjacent end faces.

The right hand end faces of the off-set portion 56 and the top portion 65 of the right hand header 41 of the bank in FIG. 8 are covered by a first closure plate 78 having an inlet means 79 in communication with the inlet 57 to the feed passageway 55 of the right hand header 41. The left hand end faces of the portions 56 and 65 of the left hand header 41 are closed by a second closure plate 80 having outlet means 81 in communication with the outlet 67 of the filtrate passageway 64 of the left hand header 41.

The right hand end faces of the off-set portion 73 and bottom portion 75 of the right hand bottom header 42 are covered by a third closure plate 82 with closes both the inlet 68 to filtrate passageway 74 and the inlet 55 to the treated feed passageway 72 of the right hand header 42. A fourth closure plate 83 having outlet means 84 in communication with the treated feed passageway 72 and outlet means 85 in communication with the filtrate passage 74 of the right hand header 42. Thus, feed is introduced into the filter bank 40 in the direction of arrow A and passes through the connected passageways 55, treated feed is discharged from the connected passageways 72 in the direction of arrow B and filtrate is drawn off from the connected passageways 64 and 74 in the direction of arrows C and D.

The filter units of the bank in FIG. 8 are held together by bolts 86, 87, 88 and 89 which pass through respective passageways 90, 91, 92 and 93 (see FIG. 5) formed in the top portions 65, the off-set portions 56 and 73 and the bottom portion 75 respectively of the headers 41 and 42. The bolts 86 to 89 also retain the closure plates 78, 80, 82 and 83. When the bolts are secured in position, the respective bevelled annular projections 62, 71 engage against the "O" rings 61 and 70 to effect a seal between adjacent filter units. A single filtration unit form of the invention can be made by applying the closure plates 78, 80, 82 and 83 to the end faces of the filter unit shown in FIGS. 5 to 7.

Figure 9:
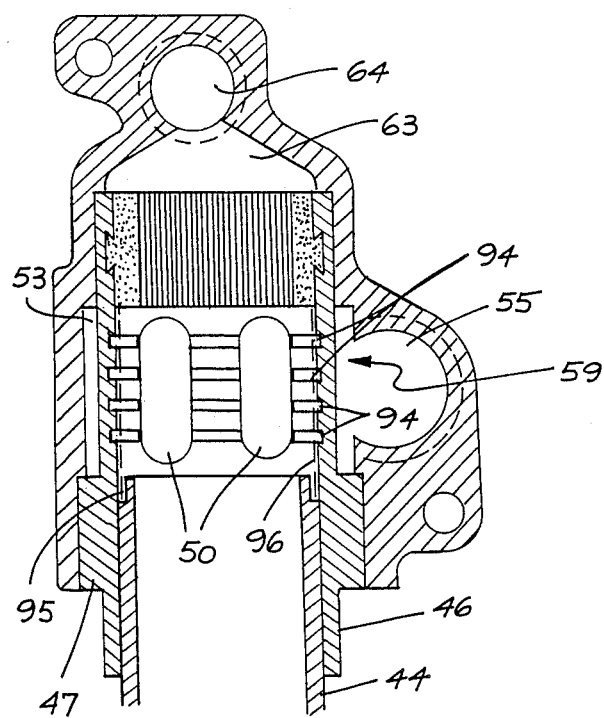
FIG. 9 is a partly broken-away view of the top end of the filter unit shown in FIGS. 5 to 7.

The top of the filter cartridge and header assembly shown in FIGS. 5 to 7 is shown in section in FIG. 9. It will be seen that the main tube 44 of the casing 40 terminates short of the transfer ports 50. Annular grooves 94 formed in the inner face of end portion 48 between the upper and lower limits of the transfer ports 50 assist the flow of feed to the fibres 43. In this instance, there are four evenly spaced grooves 94 of identical, uniform, cross-section which intersect the transfer ports at right angles to the axis of the ports 50. The end portion 95 of the main tube 44 has a reduced external diameter to provide a base for a screen 96 which is shown in dotted outline.

Figure 10:
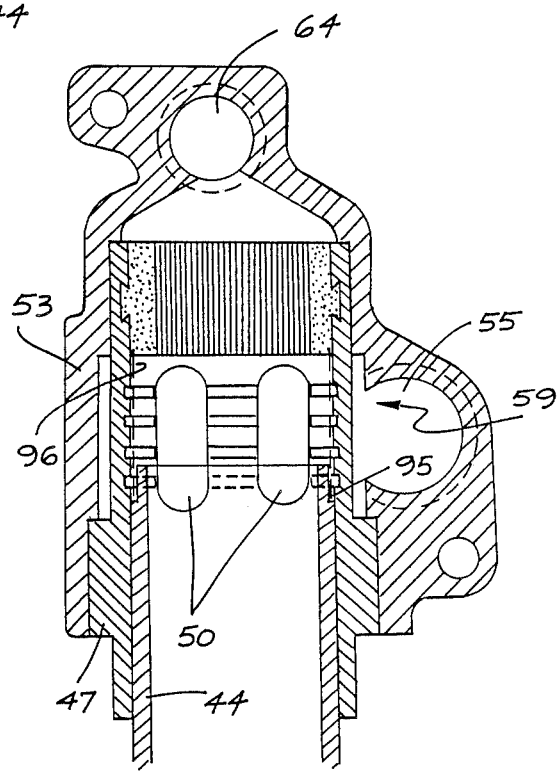
FIG. 10 is a view similar to FIG. 9 of a modified form of the top end.

The modification of the top of the filter cartridge and header shown in FIG. 10 is substantially similar to that shown in FIG. 9 except that the upper end of the main tube 44 projects past the lower groove 94 and the bottom of the transfer ports 50.

Figure 11:
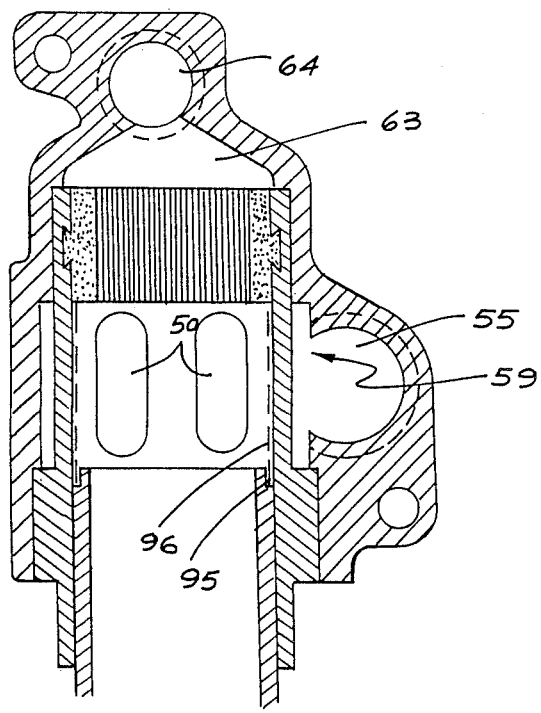
FIG. 11 is a view similar to FIG. 9 of a further modified form of the top end.
Figure 12:
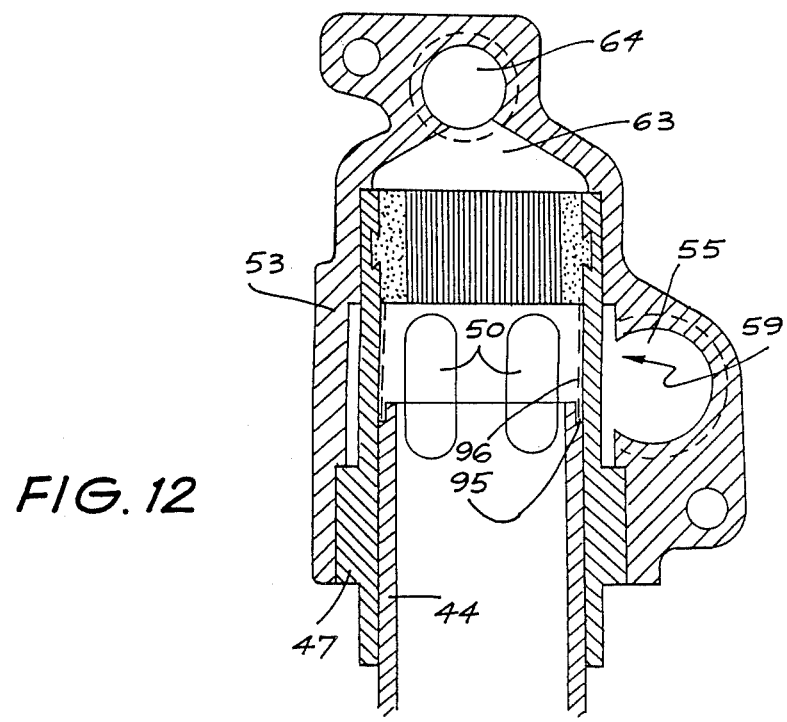
FIG. 12 is a view similar to FIG. 9 of yet a further modified form of the cartridge end.

The modification of the top end shown in FIG. 11 is substantially similar to FIG. 9 and that of FIG. 12 is substantially similar to FIG. 10 except that the grooves 94 have been omitted. As can be seen in FIGS. 9 to 12, the transfer ports 50 are not in alignment with the feed inlet 59 but are at right angles thereto. Although not fully apparent from the drawings, there are two ports 50 on one side of the end piece 48 and two ports 50 on the other side of the end piece 48.

The bottom header may be the same as any one of the headers shown in FIGS. 9 to 12 to provide a cross-flow filter in which feed is applied to the top of the cartridge and treated feed is withdrawn from the bottom of the cartridge. Although the filter is shown in a vertical disposition with feed applied to the top of the cartridge, it will be appreciated that the feed could be applied to the other header and that the filter may be in other dispositions such as inclined or horizontal. Furthermore, the transfer ports may be of any convenient configuration and disposition.

A further modification of the invention is shown in FIG. 13 wherein a different lower header provides a candle-in-shell hollow fibre filter. The filter shown in FIG. 13 includes a casing 100 in which is located a bundle of fibres 101 the upper ends of which are embedded in resin in the upper header 102 which is similar to the upper header 42 of the embodiment shown in FIGS. 5 to 8. The lower ends of the fibres 101 are each sealed but are left free of one another as can be seen in the lower portion of FIG. 13.

The lower header 103 is substantially the same as the upper header 102 and as such includes a main body portion 104 that has an upwardly extending skirt 105. A pair of "O" rings 106 form a seal between lower extremity of the casing 100 and the bottom portion of the header 103.

The internal diameter of the skirt 105 is larger than the external diameter of the enlarged end of the casing 100 to provide an annular inlet chamber 107 that is closed at the bottom by the bottom portion of the header 103 and at the top by a collar 108 bonded to the casing 100. "O" rings 109 form a seal between the upper extremity of the skirt and the casing 100.

The filter units of this invention are low cost if manufactured in plastic in that the feed and filtrate passageways or manifolds are incorporated into the header. Furthermore, cost advantages accrue as the header is cast entirely in one piece and is of a symmetrical design so that it may be used for both ends of a tube-in-shell cartridge.

A very small modification of a top header by blocking either the filtrate passageway or the treated feed passageway allows the header to be used for the opposing end of a candle-in-shell cartridge.

The low cost of the filter units allows the optimisation of economy by choice of cartridge fibre surface area versus number of defects per unit area of fibre.

As indicated above, the cartridge and header can be easily assembled with O-rings, or they may be sealed by bonding if desired. The feed passageways and filtrate passageways are not connected so that there is no chance of cross contamination in the event of a faulty "O" ring.

The rugged construction of the modules enables them to be transported in at least partially assembled form over rough terrain or delivered by helicopter into difficult sites.

As the header is compact and takes up little more cross sectional area than the fibre bundle a high density of membrane per unit volume can be achieved. There is no need for internal pipework for filtrate and feedstock ducts. The only pipework needed is at each end of long banks of assembled cartridges and headers. The units may be stacked in three dimensions to give a tightly packed array. Thus, for a given cartridge dimension and membrane surface area, the invention results in a very compact assembly.

The invention is light weight since the self-manifolding header uses less material and requires no piping with a bank of filters. Furthermore, the energy loss at elbows and branches does not occur, and the fluid dynamics is more efficient.

The invention also provides versatility of choice of cartridge. Cartridges of differing and variable dimensions can easily be interchanged between detachable headers without modification to the remainder of the filter equipment. Thus adjustment of cartridge length for different feedstock properties is possible.

Insertion of the cartridge into the detachable form of header is made easy in that the collar is bonded to the cartridge casing so that the "O" rings at the end of the cartridge casing need not be forced past the first pair of O-ring fittings of the header.

The space between the header, the cartridge and cartridge collar creates a large feed chamber, which, with the transfer ports in the end of the cartridge casing, allows feed to enter evenly onto the outside of the fibres. The feed stream enters tangentially to the feed chamber, causing swirling of the feed stream around the chamber.

For tube-in-shell filters, the chamber and transfer ports around the exit end of the cartridge allow rapid removal of dirt and solid material by the swirling, tangentially flowing feed exit steam. When backwashing, the inlet design facilitates removal of deposits that have been loosened from the outside of the fibres by the liquid or gaseous backwashing surge. For candle-in-shell filters, cleaning is automatic as the flow sweeps away dirt from the bottom of the cartridge. There is no dead space for the dirt to accumulate.

The candle-in-shell filter has no restriction to flow of feed stock past the end of the fibre bundle because there is no direction change for the feed stock and the fluid does not have to flow across the bundle to exit the cartridge as is the case of the tube-in-shell cartridge. The feed is flowing past any of the active filter area. The filter is placed upright with the hollow fibres dangling downwards, and the feed is allowed to flow straight past the free ends. Any operation such as backwashing or clearing lumens of liquid is done in such a way as to keep the free ends under tension by having at least some flow in the downwards direction on the outside of the fibres.

By manufacturing the header or cartridge, or both, from a clear plastic, a failed cartridge may easily be detected during bubble testing. The wetted fibres of the failed cartridge pass bubbles under a much lower air back pressure than the fibres of sound cartridges as in the bubble test described above. Visual detection of a failed cartridge may also be accomplished by incorporation of a clear inspection port in either the header or the cartridge shell. With turbid feeds which produce a clear filtrate, a failed fibre may be detected by turbidity in the permeate from the filter.

As the cartridge shell and the assembly is low cost, the amount of fibre surface area per cartridge can be optimised for different fibres. Thus fibres with a high initial or in-use defect rate per area of fibre can be manufactured into cartridges containing less fibres than would be the case for low defect rate fibres. As a consequence, the penalty of a failed cartridge is less.

The flexibility in choice of construction allows the selection of a corrosion resistant manufacturing material for both the cartridge and the header for a particular application. The materials of construction may also be chosen to resist high temperatures such as those encountered in handling hot foodstuffs.

When the equipment is assembled, the feed and filtrate streams are not connected and are separated by two O-ring seals that provide good protection against cross contamination. However, for critical uses such as very pure water, the header may be bonded to the cartridge, thus providing even greater protection against cross contamination. The low cost of the apparatus allows it to be discarded if necessary for these special uses.

As will be apparent for the foregoing description, banks of cartridges and headers may be connected in series or parallel to accommodate differing feedstocks.

The invention will now be further described by reference to the following examples:

EXAMPLE 1

A series of water flux tests were carried out on banks of five cartridges of both the prior art design and the design of the present invention.

The results are tabulated below:

| Average Transmembrane Pressure Drop (kPa) | Filtrate Rate (L/hr) | Cartridge design |
| --- | --- | --- |
| 65 | 5,300 | FIG. 1 |
| 88 | 6,000 | FIG. 1 |
| 100 | 7,200 | FIG. 1 |
| 88 | 9,000 | FIG. 5 |

The results showed a 50% improvement in filtrate rate for the design of the present invention over the prior art design shown in FIG. 1.

EXAMPLE 2

A series of experiments investigating the effect of high cross-flow on pressure drop down filters with the self manifolding header of the present invention was completed and the results compared for three modifications to the basic design. All the tests were performed on a single filter with water as the feedstock. Tests were carried out for four designs at two temperatures, 20° C. and 70° C.

The four filter units tested each had identical headers at each end of the cartridge. The headers used are those shown in FIGS. 9 to 12 and the results graphed in FIGS. 15 to 18.

Figure 14:
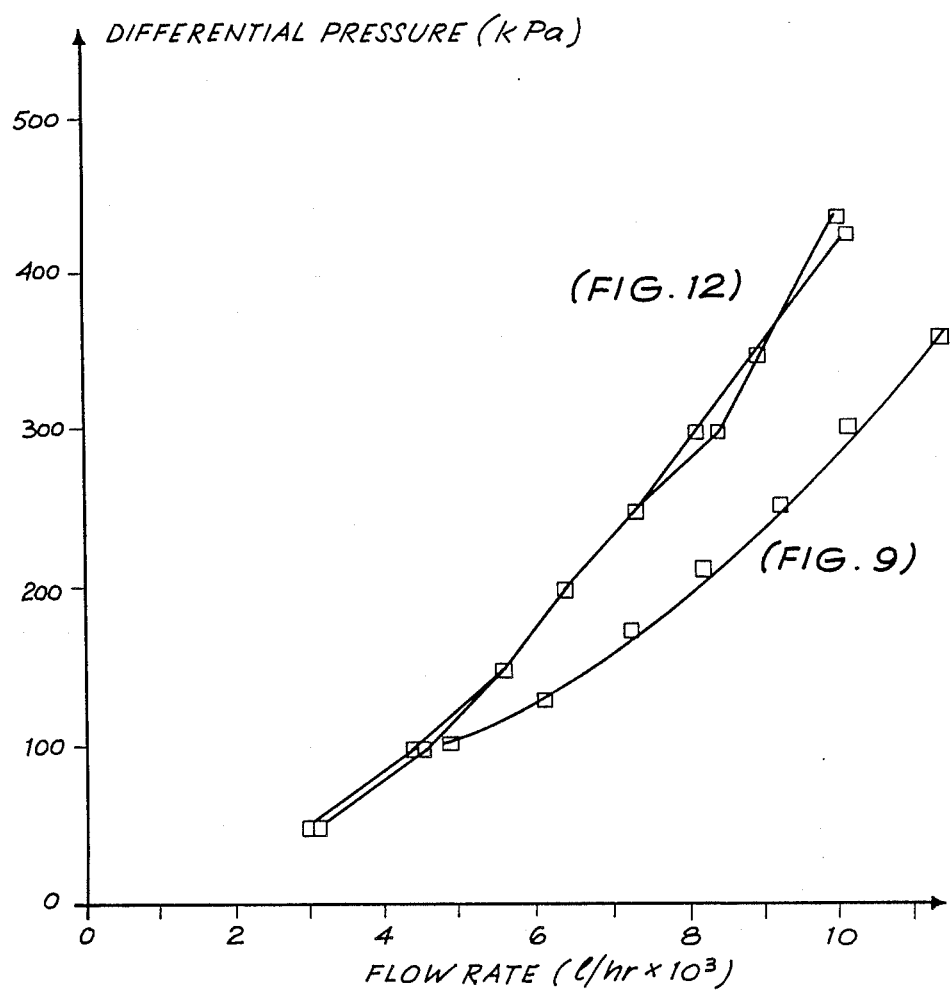
FIG. 14 is a graph comparing differential pressure against flow rate at 20° C. for a filter having the outlet end shown in FIG. 12 with the outlet end shown in FIG. 9.

The graphs in FIG. 14 shows a comparison of differential pressure against recirculation feed flow rate for the filter unit with an extended tube and smooth casing at both ends (FIG. 12 embodiment) and the filter unit with the shorter tube and grooves (FIG. 9 embodiment), at 20° C.

Figure 15:
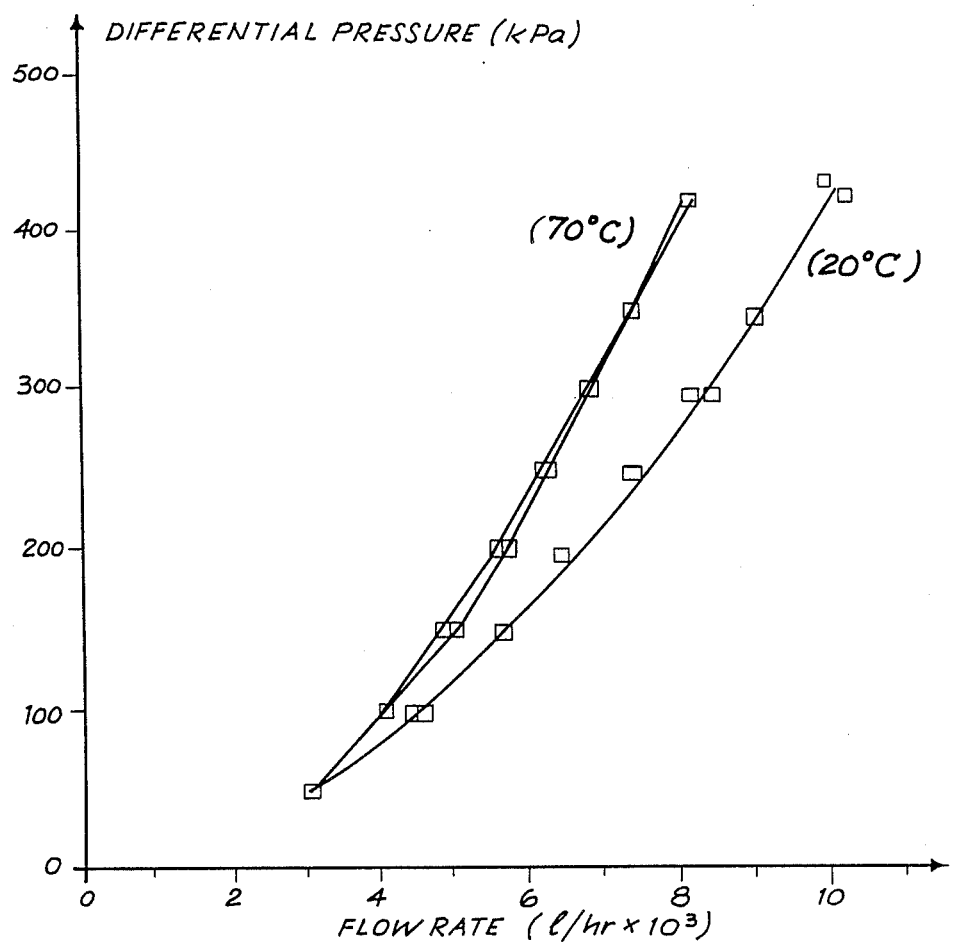
FIG. 15 is a graph comparing differential pressure against flow rate for a filter having the outlet end shown in FIG. 12 at 70° C. with a filter having the same end at 20° C.

The graph of differential pressure against feed flowrate for the filter unit with an extended tube and smooth casing (FIG. 12 embodiment) is shown in FIG. 15 for feed at 20° C. and 70° C.

Figure 16:
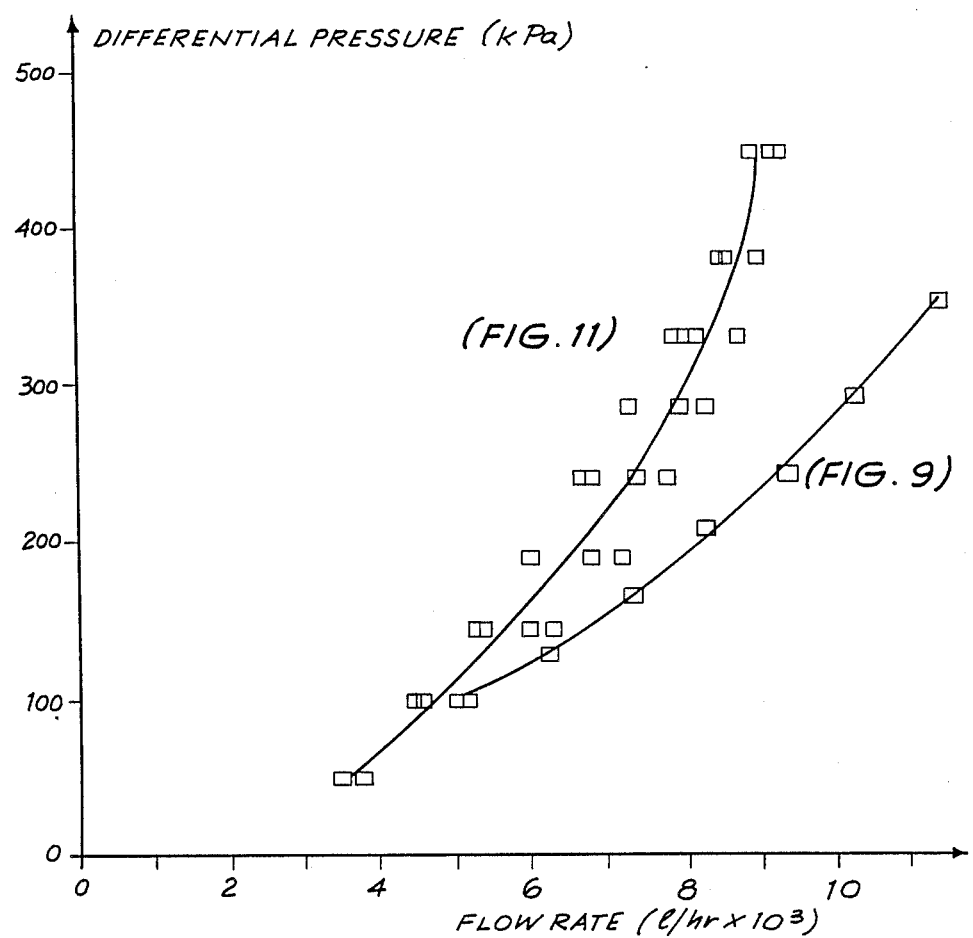
FIG. 16 is a graph comparing differential pressure against flow rate at 20° C. for a filter having the outlet end shown in FIG. 11 with a filter having the outlet end shown in FIG. 9.

The graph in FIG. 16 shows a comparison of differential pressure against recirculation feed flow rate for the filter unit with the shorter tube, and a smooth casing at both ends (FIG. 11 embodiment) and the filter unit with the shorter tube and grooves (FIG. 9 embodiment), at 20° C.

Figure 17:
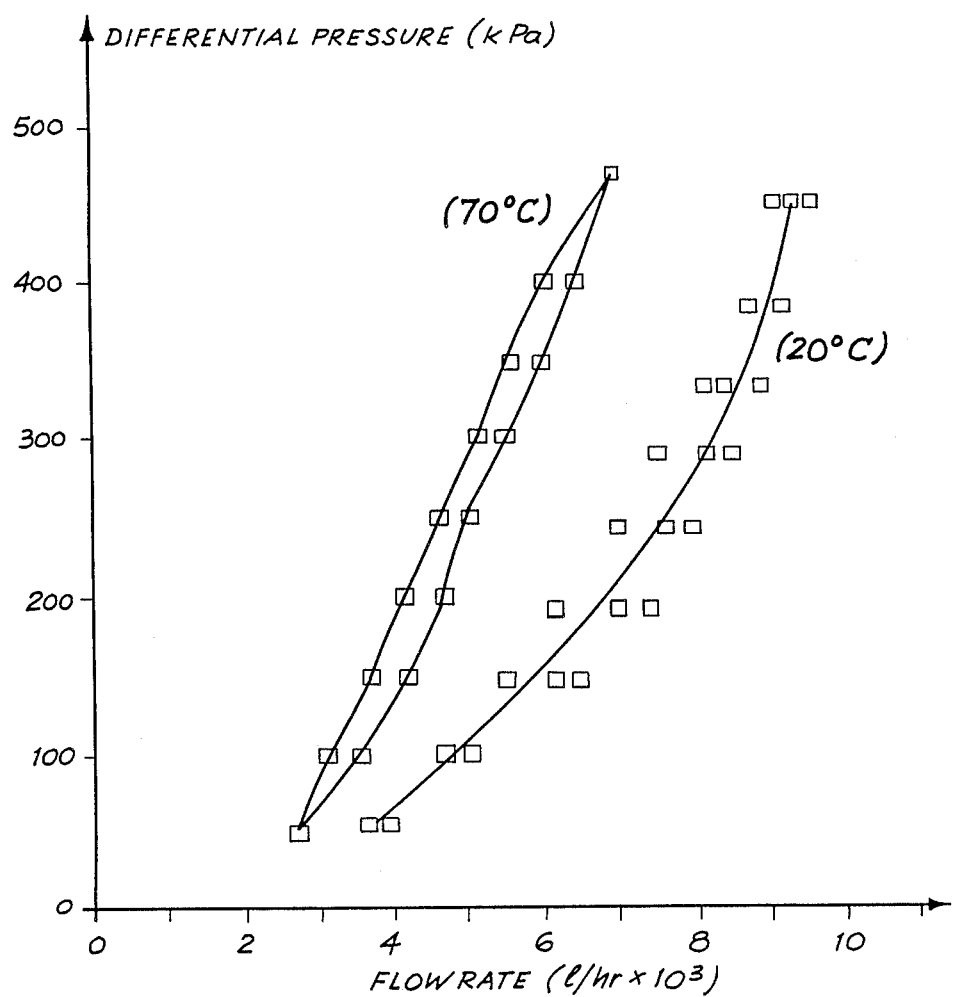
FIG. 17 is a graph comparing differential pressure against flow rate for a filter having the outlet end shown in FIG. 11 at 70° C., with a filter having the same end at 20° C. and, FIG. 18 is a graph comparing differential pressure against flow rate at 20° C. for a filter having the outlet end shown in FIG. 10 with a filter having the outlet end shown in FIG. 9.

The graph of differential pressure against feed flowrate for the filter unit with the shorter tube and smooth casing (FIG. 11 embodiment) is shown in FIG. 17 for feed at 20° C. and 70° C.

Figure 18:
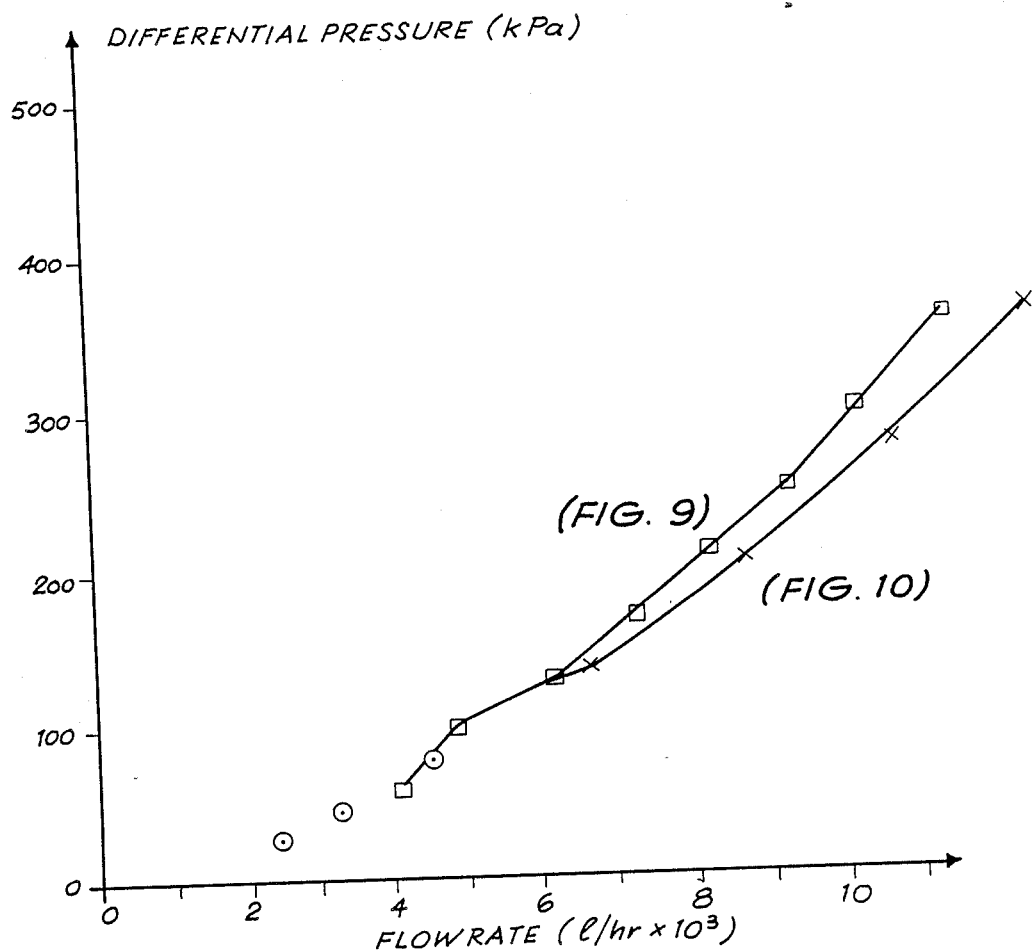

The graph in FIG. 18 shows a comparison of differential pressure against recirculation feed flow rate for the filter unit with the extended tube, and grooves at both ends (FIG. 10 embodiment) and the filter unit with the shorter tube and grooves (FIG. 9 embodiment), at 20° C.

The filter unit with the extended tube and grooves (FIG. 10 embodiment) gave the best performance. The filter with the shorter tube and grooves (FIG. 9 embodiment) gave superior performance to both the filter with the extended tub and smooth casing (FIG. 12 embodiment) and the filter with the shorter tube and smooth casing (FIG. 11 embodiment. Both filters with the smooth casing (embodiments of FIGS. 11 and 12) gave similar performances.

In the two cases tested at 70° C., the improvement in pressure drop response was greater than the corresponding improvement at 20° C.

The filter unit with the grooves formed on the inside of the outlet end of the casing (FIG. 9) gave superior performance to both the prior art design and the filter unit of this invention without the grooves (FIG. 11). This improvement was more apparent at the higher test temperature, as can be seen when comparing results of FIG. 18 with FIG. 14 (temperature 20° C.) and FIG. 15 (temperature 70° C.)

The filter units of this invention with both an extended casing on the outlet and grooves on the inside of the casing (FIG. 10) gave the best performance of all of the designs tested at both temperatures, as can be seen by the second curve on FIG. 18.

EXAMPLE 3

A series of tests using low-fouling feedstock on a range of new and old filter designs was carried out. The filters were operated in three different modes of backwash to test the efficacy of the design on filtrate rate recovery for the different designs. The crossflow was 2,600 to 3,000 liters per hour except where otherwise indicated, using 1% weight for weight ferric hydroxide suspension.

The backwash modes used were:

Backwash Type 1

Step 1—The lumens are drained of filtrate.
Step 2—The filter (with liquid on the feed side of the membranes and gas on the filtrate side of the membranes) is pressurised by applying gas pressure to the lumens, and the feed flow is shut off.
Step 3—The pressure on the feed side of the filter is released, and the gas pressure on the lumens is maintained, and meanwhile, the feed is left shut off.
Step 4—The feed flow is restarted while the gas pressure is maintained in the lumens to carry substantially all the accumulated detritus out of the filter.
Step 5—The gas pressure is removed from the filtrate side of the filter and filtrate allowed to refill the lumens.
Step 6—The filter is pressurised with the filtrate and feed exit shut either by pump pressure on the feed inlet or by shutting off the feed inlet and applying pressure to the filtrate line so as to replace the gas in the pores of the membrane with liquid.

Backwash Type 2

Steps 1, 2 and 3 the same as Backwash Type 1, and then;
Step 4—The feed flow is restarted in the opposite direction to when the filter is used to filter feed, while the gas pressure is maintained in the lumens to carry substantially all the accumulated detritus out of the filter.
Steps 5 and 6 the same as Backwash Type 1.

Backwash Type 3

Steps 1, 2 and 3 the same as Backwash Type 1, and then;
Step 4—The feed flow is restarted but with the direction of flow reversed at regular intervals with gas pressurisation of the lumens between reversals to carry substantially all the accumulated detritus out of the filter.
Steps 5 and 6 the same as Backwash Type 1.

A 1% weight for weight suspension of ferric hydroxide at 54 C. was used as the feed with a crossflow of 2,600 to 3,000 liters per hour and a transmembrane pressure of 200 kilopascals. Each trial was for six minutes, and the results are tabulated below:

| Cartridge Type (as expressed in Fig.) | Backwash Type | Average filtrate flux over 6 minutes (1/hr) | Peak filtrate flux immediately after backwash (1/hr) |
|---|---|---|---|
| 2 | 1 | 239 | 390 |
|   | 2 | 340 | 580 |
|   | 3 | 350 | 590 |
| 3 | 1 | 365 | 860 |
|   | 2 | 384 | 920 |
|   | 3 | 380 | 1110 |
| 4 | 1 | 375 | 710 |

-continued

| Cartridge Type (as expressed in Fig.) | Backwash Type | Average filtrate flux over 6 minutes (l/hr) | Peak filtrate flux immediately after backwash (l/hr) |
|---|---|---|---|
|  | 2 | 319 | 700 |
|  | 3 | 429 | 1120 |
| 11 | 1 | 487 | 840 |
|  | 2 | 456 | 680 |
|  | 3 | 539 | 990 |
| 12 | 1 | 556 | 780 |
|  | 2 | 591 | 930 |
|  | 3 | 613 | 1050 |
| 10* | 1 | 513 | 770 |
|  | 2 | 447 | 800 |
|  | 3 | 536 | 900 |

*The crossflow was 1,500 to 2,000 liters per hour in this case.

From the table, it can be readily seen that the FIG. 10 embodiment, which gave the best pressure drop results in Example 2, did not perform as well in terms of filtrate rate as the FIG. 12 embodiment. Whilst the prior art designs gave high peak recoveries of filtrate rate (column 4 of the above table), they did not perform as well on average as the filters of the present invention.

Various modifications may be made in details of design and construction without departing from the scope and ambit of the invention.

What is claimed as new and desired to be secured by Letters Patent of the United States is:

1. A filter unit comprising:
   (i) an elongated open-ended casing having transfer ports adjacent each end thereof to provide fluid communication between the outside and inside of the casing,
   (ii) a bundle of hollow, porous, polymeric fibres within the casing,
   (iii) a first plug at one end of the casing in which one end of the bundle of fibres is embedded whereby the plug prevents flow of fluid out said one end of the casing other than through the lumens of the fibres,
   (iv) means for preventing substantial flow of fluid out of said casing other than through the lumens of said fibres within said casing and which includes a second plug closing the other end of the casing for preventing the flow of feed through the end of the casing,
   (v) a first transfer header at said one end of the casing and including:
      (a) a body portion that encloses said one end of the casing,
      (b) a feed passageway extending through said first header having an inlet at one end for receiving feed to be treated, an outlet at the other end adapted to be connected to the inlet of the feed passageway of an adjacent first header and a discharge port for delivering feed to the casing,
      (c) an inlet chamber in fluid communication with the discharge port of the feed passageway and the transfer port at said one end of the casing,
      (d) an outlet chamber for receiving filtrate from the open ends of the fibre lumens, and,
      (e) a filtrate passageway extending through said first header having a receiving port for receiving filtrate from the outlet chamber, an outlet at one end for discharging filtrate and an inlet at the other end adapted to be connected to the outlet of the filtrate passageway of an adjacent first header,
   (vi) a second transfer header at the other end of the casing and including:
      (a) a body portion that encloses said other end of the casing,
      (b) an outlet chamber for receiving treated feed from the transfer port at said other end of the casing, and,
      (c) a treated feed passageway extending through said second header having a receiving port for receiving treated feed from the outlet chamber, an outlet at one end for discharging treated feed and an inlet at the other end adapted to be connected to the outlet of the feed passageway of an adjacent second header.

2. A filter unit according to claim 1 wherein the second plug closing the other end of the casing had embedded therein the other end of the bundle of fibres whereby the second plug prevents flow of fluid out said other end of the casing other than through the lumens of the fibres and wherein the second header has an outlet chamber for receiving filtrate from the fibre lumens and a filtrate passageway extending therethrough which has a receiving port for receiving filtrate from the outlet chamber, an outlet at one end for discharging filtrate and a inlet at the other end adapted to be connected to the outlet of the filtrate passageway of an adjacent first header.

3. A filter unit according to claim 1 or claim 2 wherein the first header is a one-piece moulding.

4. A filter unit according to claim 1 or claim 2 wherein the second header is a one-piece moulding and is identical to the first header.

5. A filter unit according to claim 1 or claim 2 wherein the first and second headers are releasably secured to the casing.

6. A filter unit according to claim 1 or claim 2 wherein the first and second headers are secured to the casing to form an integral cartridge.

7. A filter unit according to claim 1 or claim 3 wherein the feed passageway is located in a first off-set portion of the body of the first header.

8. A filter unit according to claim 7 wherein the ends of the off-set portions are planar and parallel.

9. A filter unit according to claim 7 which comprises a recess around the inlet or outlet to each feed passageway for receiving an "O" ring.

10. A filter unit according to claim 1 or claim 2 wherein the treated feed passageway is located in a first off-set portion of the body of the second header.

11. A filter unit according to claim 10 wherein the ends of the off-set portions are planar and parallel.

12. A filter unit according to claim 10 and including a bevelled annular projection at the other end of each passageway adapted to engage the "O" ring of an adjacent filter unit.

13. A filter unit according to claim 1 or claim 2 wherein the filtrate passageway is located in a second off-set portion of the first header.

14. A filter unit according to claim 13 and including a recess around the inlet or outlet to each filtrate passageway for receiving an "O" ring.

15. A filter unit according to claim 14 and including a bevelled annular projection at the other end of each passageway adapted to engage the "O" ring of an adjacent filter unit.

16. A filter unit according to claim 1 wherein the casing extends into the first and second header but terminates short of the transfer ports.

17. A filter unit according to claim 1 wherein the casing extends into the first and second header and beyond the nearer end of the transfer ports.

18. A filter unit according to claim 1 wherein the transfer ports are elongated and extend parallel to the axis of the casing.

19. A filter unit according to claim 1 wherein the casing includes a main tube and an end portion at each end of the main tube.

20. A filter unit according to claim 19 wherein annular grooves are formed in the inner face of the end portion of the casing at the transfer ports.

21. A filter unit according to claim 20 wherein the grooves are evenly spaced and extend across the transfer ports.

22. A filter unit according to claim 21 wherein the grooves are of identical, uniform cross-section and intersect the transfer ports at right angles to the axis of the transfer ports.

23. A bank of filter units wherein each filter unit comprises:
 (i) an elongated open-ended casing having transfer ports adjacent each end thereof to provide fluid communication between the outside and inside of the casing,
 (ii) a bundle of hollow, porous, polymeric fibres within the casing,
 (iii) a first plug at one end of the casing in which one end of the bundle of fibres is embedded whereby the plug prevents flow of fluid out said one end of the casing other than through the lumens of the fibres,
 (iv) means for preventing substantial flow of fluid out of said casing other than through the lumens of said fibres within said casing and which includes a second plug closing the other end of the casing for preventing the flow of feed through the end of the casing,
 (v) a first transfer header at said one end of the casing and including:
  (a) a body portion that encloses said one end of the casing,
  (b) a feed passageway extending through said first header having an inlet at one end for receiving feed to be treated, an outlet at the other end adapted to be connected to the inlet of the feed passageway of an adjacent first header and a discharge port for delivering feed to the casing,
  (c) an inlet chamber in fluid communication with the discharge port of the feed passageway and the transfer port at said one end of the casing,
  (d) an outlet chamber for receiving filtrate from the open ends of the fibre lumens, and,
  (e) a filtrate passageway extending through said first header having a receiving port for receiving filtrate from the outlet chamber, an outlet at one end for discharging filtrate and a inlet at the other end adapted to be connected to the outlet of the filtrate passageway of an adjacent first header,
 (vi) a second transfer header at the other end of the casing and including:
  (a) a body portion that encloses said other end of the casing,
  (b) an outlet chamber for receiving treated feed from the transfer port at said other end of the casing, and,
  (c) a treated feed passageway extending through said second header having a receiving port for receiving treated feed from the outlet chamber, an outlet at one end for discharging treated feed and an inlet at the other end adapted to be connected to the outlet of the feed passageway of an adjacent first header and the filters are connected together by said headers so that the feed passageways and filtrate passageways are connected in series whereby each filter may be supplied from the one source of feed with a portion of the feed being introduced into the inlet chamber of each filter, the filtrate from each filter is directed to the interconnected filtrate passageways and the treated feed from each filter is directed to the interconnected treated feed passageways.

24. A bank of filter units according to claim 23 wherein the units are connected together by bolt means which force the units together whereby the respective bevelled annular projections engage and compress the adjacent "O" rings.

25. A bank of filter units according to claim 23 or claim 24 and including means for introducing feed into one end unit of the bank, means for introducing feed from the other end unit of the bank, means for withdrawing filtrate from at least one end unit of the bank and means for withdrawing treated feed from at least one end unit of the bank.

26. A bank of filter units according to claim 25 wherein each unit has a locating lug on one side and a locating recepticle on the other.

27. A method of operating a filter unit which utilizes fibre lumens and which comprises:
 (i) draining the fibre lumens of filtrate,
 (ii) terminating the feed flow with feed remaining on the feed side of the filter and applying gas to the lumens to pressurize the filter,
 (iii) releasing the pressure on the feed side of the filter while maintaining the gas pressure and while there is no flow of feed,
 (iv) resuming flow of feed and maintaining gas pressure in the lumens to carry substantially all of the accumulated detritus out of the filter,
 (v) removing the gas pressure from the filtrate side of the filter and filtrate allowed to refill the lumens, and
 (vi) pressurizing the filter so as to replace the gas in the pores of the membrane with liquid.

28. A method according to claim 27 which comprises pressurizing the filter by closing a filtrate outlet and treated feed outlet thereof and by applying pump pressure on the feed inlet thereof.

29. A method according to claim 27 which comprises pressurizing the filter by closing the filtrate outlet, feed inlet and treated feed outlet thereof and by applying pressure to the filtrate outlet.

30. A method according to claim 27 which comprises restarting the feed flow in a direction opposite to normal feed flow while maintaining the gas pressure in the lumens to carry substantially all of the accumulated detritus out of the filter.

31. A method according to claim 27 which comprises restarting the feed flow and reversing its direction at regular intervals while maintaining the gas pressure in the lumens between feed flow reversals to carry substantially all of the accumulated detritus out of the filter.

* * * * *